US012704196B2

(12) United States Patent
Nguyen et al.

(10) Patent No.: US 12,704,196 B2
(45) Date of Patent: Aug. 11, 2026

(54) MULTI-WAY CONTROL VALVE

(71) Applicant: RB Distribution, Inc., Colmar, PA (US)

(72) Inventors: Tam Nguyen, Lincoln University, PA (US); Glenn Sincovich, Doylestown, PA (US); Sean Cattie, Perkasie, PA (US); Bryan McMasters, Lansdale, PA (US)

(73) Assignee: RB Distribution, Inc., Colmar, PA (US)

(*) Notice: Subject to any disclaimer, the term of this patent is extended or adjusted under 35 U.S.C. 154(b) by 34 days.

(21) Appl. No.: 18/493,119

(22) Filed: Oct. 24, 2023

(65) Prior Publication Data

US 2025/0129865 A1 Apr. 24, 2025

(51) Int. Cl.
*F16K 31/53* (2006.01)
*F16K 11/08* (2006.01)

(52) U.S. Cl.
CPC ............ *F16K 31/535* (2013.01); *F16K 11/08* (2013.01)

(58) Field of Classification Search
CPC ........................... F16K 31/535; F16K 37/0033
USPC ..................................................... 324/207.25
See application file for complete search history.

(56) References Cited

U.S. PATENT DOCUMENTS

2014/0305405 A1* 10/2014 Felix ...................... F02M 26/53 137/15.18
2019/0061117 A1* 2/2019 Muramatsu ............. B25B 21/02
2019/0072191 A1* 3/2019 Shen ....................... F01P 7/165
2020/0217430 A1* 7/2020 Inagaki ................. F16K 1/2028
2021/0071568 A1* 3/2021 Izumi ...................... F16K 1/221
2021/0341076 A1* 11/2021 Martin .................... F16K 31/53

OTHER PUBLICATIONS

Part Photographs of Nissan Armada/Valve-Water-Control, Website 2022 (https://www.nissanpartsnh.com/p/Nissan_Armada/Valve-Water-Control/89435508/21250-EZ31A.html?partner=BingShopping&kwd=&matchtype=e&device=c&network=s&userLocation=&msqs=nissan%20armada%20part%2021250-ez31a&bingCampaignID=410894145&bingAdGroupID=1333708376255923&bingAdID=83356877244740&bingExtensionID=&msclkid=5cf06f4518e315f3f98c0a72ee75654f.

* cited by examiner

*Primary Examiner* — Reinaldo Sanchez-Medina
*Assistant Examiner* — Nicole Gardner
(74) *Attorney, Agent, or Firm* — Volpe Koenig

(57) ABSTRACT

A multi-way control valve for controlling the flow of fluid between a fluid inlet and one or more fluid outlets. The multi-way control valve includes a swivel valve assembly that includes a spur gear with threaded apertures and an alignment member for fixing a housing that includes a magnet to the spur gear with fasteners. The multi-way control valve preferably includes all metallic gears.

14 Claims, 4 Drawing Sheets

30
70
68
84
84
48
44
36
34
38

30
70
84
84
68
54
58
48
52
44
54
60
36
34

MULTI-WAY CONTROL VALVE

BACKGROUND

Multi-way control valves are well-known for use controlling the flow of vehicle cooling fluid between and among various components of a motor vehicle engine and transmission. Such components can include a radiator, an oil cooler, a transmission cooler, a heater core, and/or other engine/transmission related components.

For example, during a cold start the multi-way control valve can be configured to shunt fluid flow to the oil cooler and/or transmission cooler until desired operating temperatures are met. Once the operating temperatures (or other parameters) are met, the multi-way control valve can be configured to permit flow to the oil cooler and/or transmission cooler.

In general, multi-way control valves include an electric motor coupled to a swivel valve assembly that is rotatably mounted in a valve housing. The swivel valve assembly includes a valve member that is selectively rotated within the valve housing to block, permit, or partially restrict flow of cooling fluid in various flow passageways coupled to one or more of the above-listed components. The electric motor is typically coupled to the swivel valve assembly by a gear train, which typically includes plastic gears and components.

SUMMARY

It has been found that thermal cycling of existing multi-way control valves and stresses imparted to the plastic gears during operation result in premature gear failure. This failure can cause a multi-way control valve to fail in a manner that affects performance and/or results in overheating of components. One aspect contributing to the failure of the know vales is the practice of over molding of plastic parts that rely on the plastic bonding to handle the thermal cycling and stresses associated with use of the valve. The disclosed multi-way control valve addresses this shortcoming by providing a structural and mechanical connection that eliminates the reliance on plastic bonding.

DETAILED DESCRIPTION

The disclosed multi-way control valve will be described in detail with reference to the above drawings figures wherein the same or similar element is identified with the same indicator throughout the description. The terminology used herein is for the purpose of describing particular aspects only and, unless defined otherwise herein, all technical and scientific terms have the meaning commonly understood by one of ordinary skill in the art.

Figure 1:
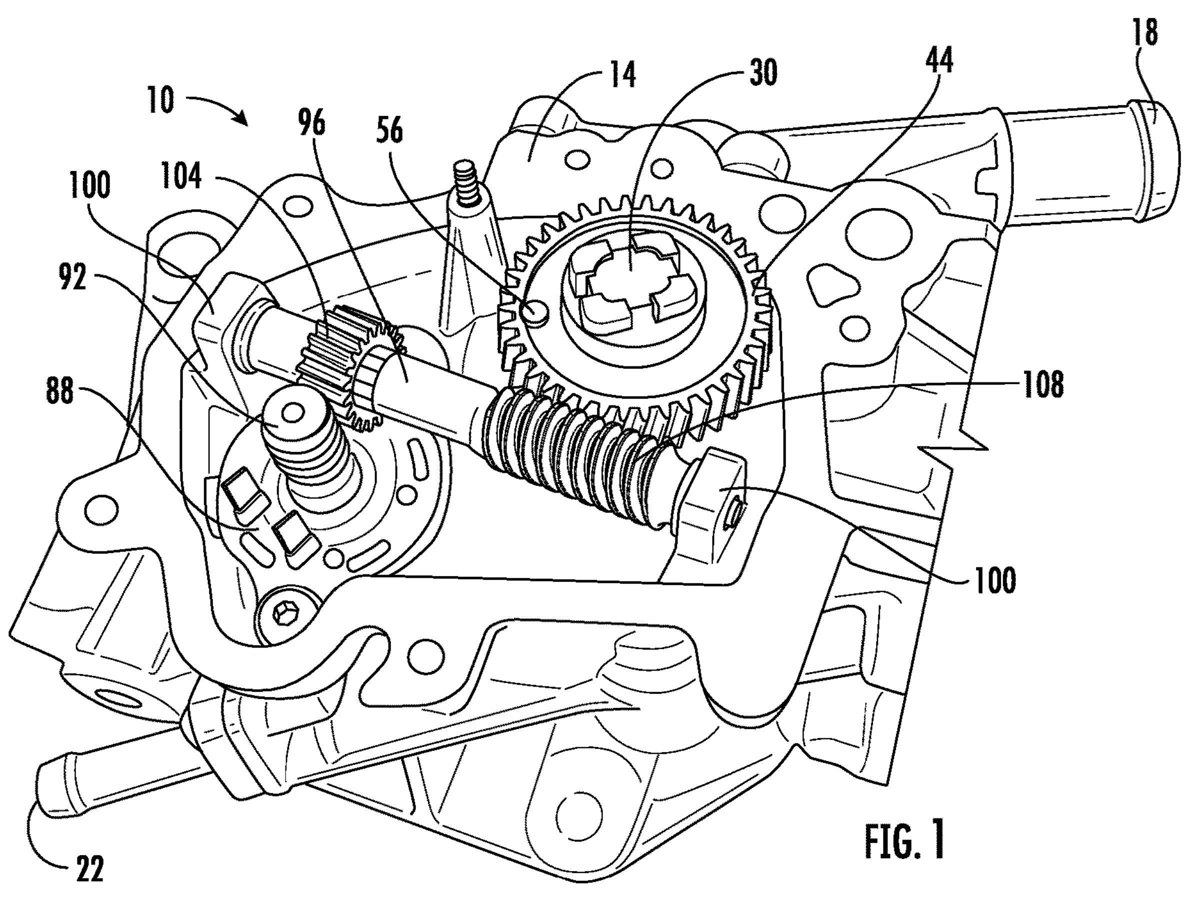
FIG. 1 is a perspective view of a multi-way control valve with the cover removed to reveal the inner structure and gear arrangement.
Figure 2:
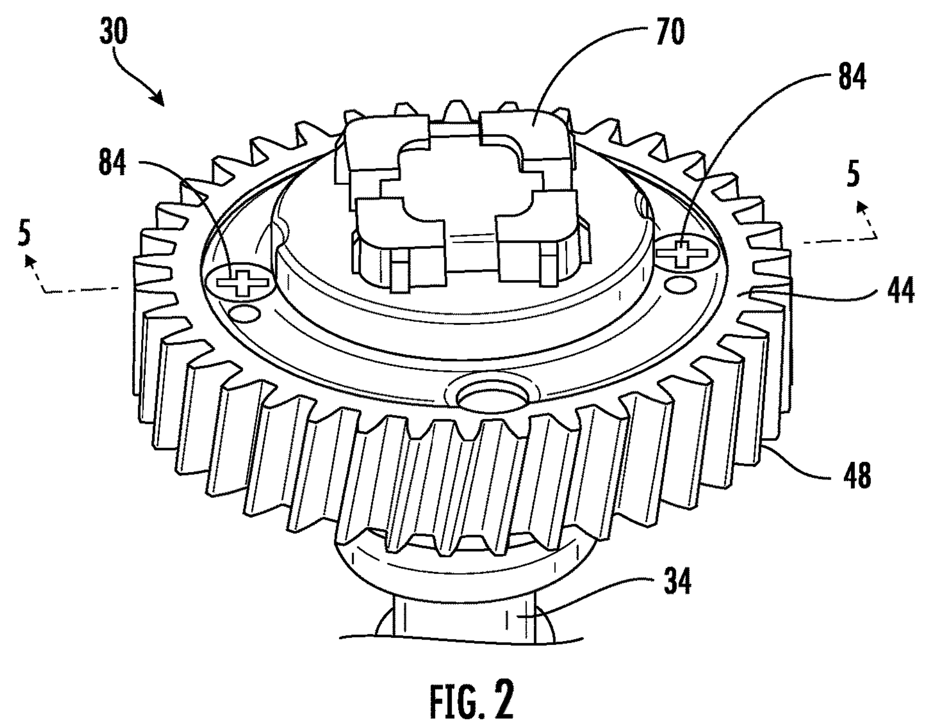
FIG. 2 is a perspective view of a swivel valve gear assembly shown in FIG. 1.

FIG. 1 illustrates the structure of an exemplary multi-way control valve identified generally by reference numeral 10. The illustrated multi-way control valve 10 includes a valve housing 14 having multiple ports 18, 22 for the inflow and outflow of cooling fluid. Additional ports may be provided in the valve housing 14 according to the specific application without altering the structure of the present disclosure.

Figures 3, 4:
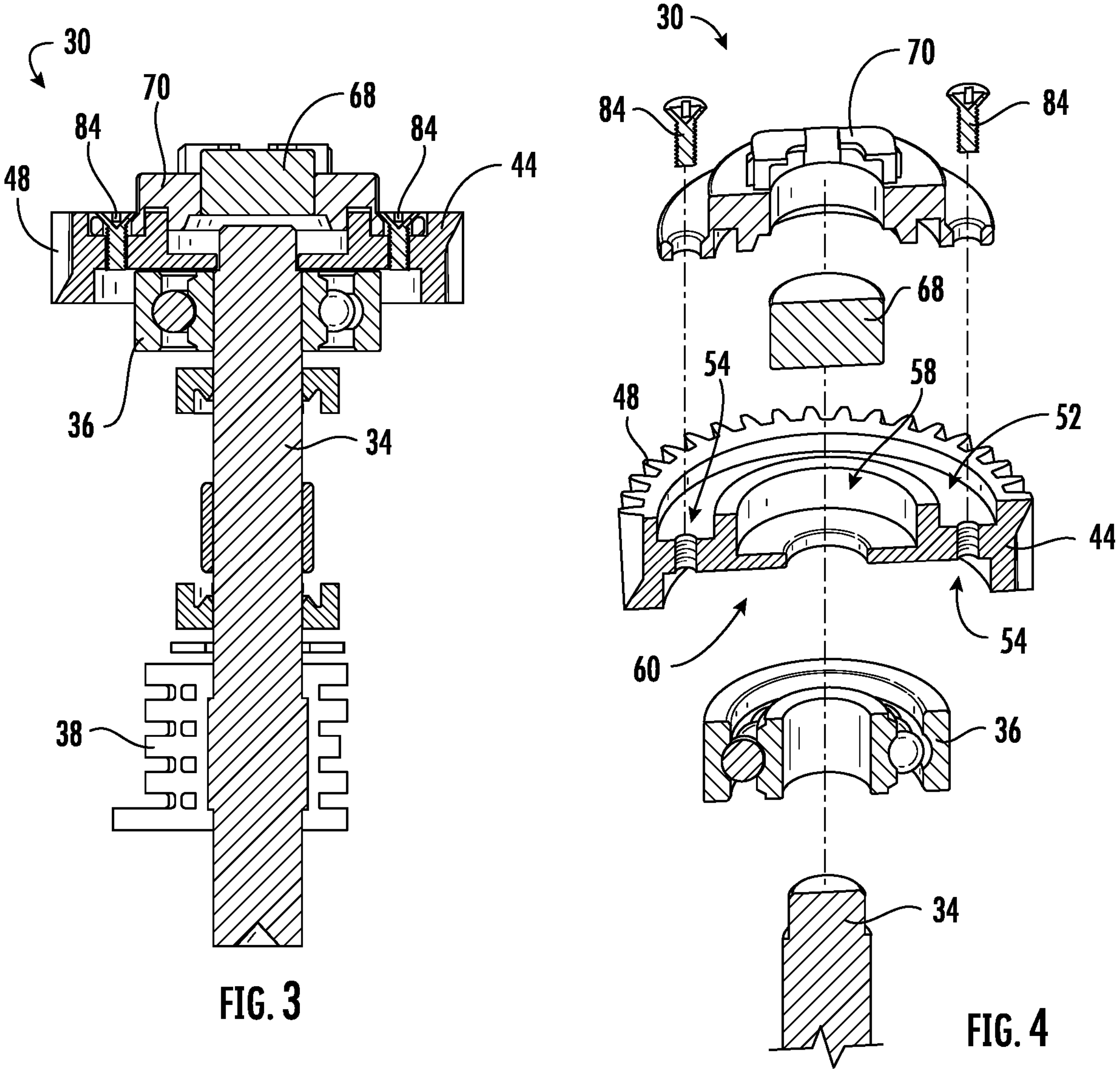
FIG. 3 is a sectional side view of the full swivel valve assembly and valve member that is included in the multi-way control valve in FIG. 1.
FIG. 4 is an exploded cross-sectional view of the swivel valve gear assembly along the lines 4-4 in FIG. 2.
Figure 5:
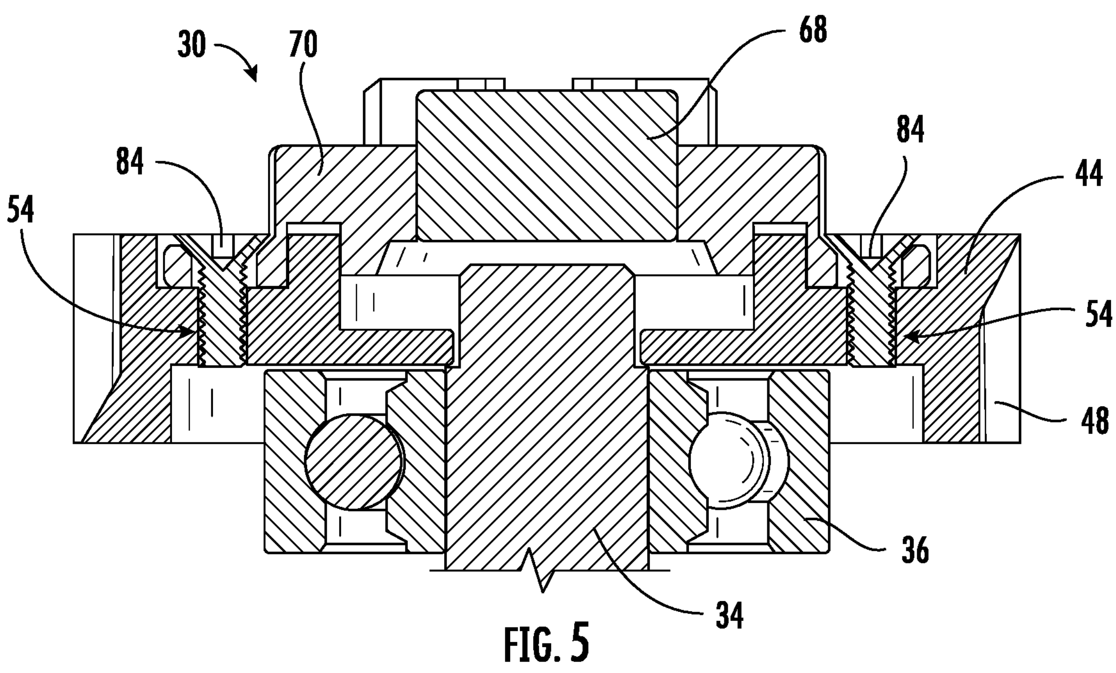
FIG. 5 is an assembled sectional view of the swivel valve gear assembly in FIG. 4.
Figure 6:
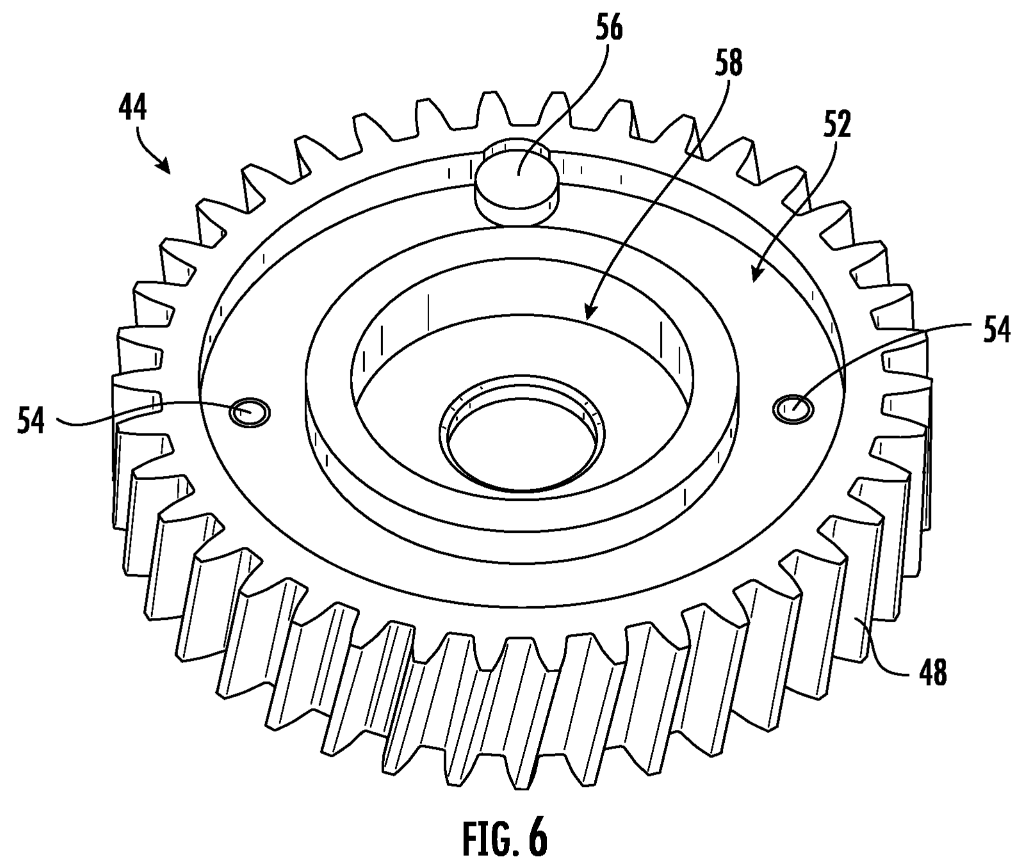
FIG. 6 is a perspective view of an embodiment of a spur gear in the swivel valve assembly of FIGS. 2-5.
Figure 7:
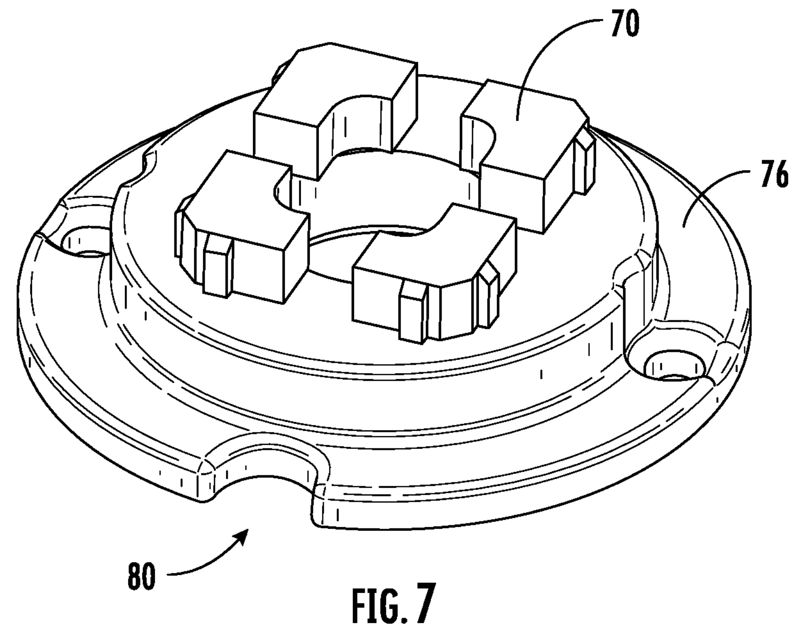
FIG. 7 is a perspective view of an embodiment of a magnet housing in the swivel valve assembly of FIGS. 2-5; and, FIG. 8 is a perspective view of the worm gear and spur gear shaft of the multi-way control valve shown in FIG. 1.

Each of the ports 18, 22 is in fluid communication with a valve chamber (not shown) via one or more internal flow passageways (not shown) a multi-way control valve 10. A swivel valve assembly 30, see FIG. 4, is supported for rotation in the valve housing 14 for selectively restricting or permitting flow between and among the internal passageways and, ultimately, to one or more components fluidly connected to the ports 18, 22 of the valve housing 14.

With reference to FIGS. 1-4, the swivel valve assembly 30 typically includes a valve shaft 34, a bearing 36, a valve member 38, and a spur gear 44. When the swivel valve assembly 30 is assembled in the valve housing 14, the valve member 38 is positioned in the valve chamber to control the flow. Rotation of the jack shaft 96 causes movement or rotation of the swivel valve assembly 30, the valve shaft 34, and the valve member 38 to selectively restrict or permit flow through the valve chamber and ports 18, 22 of the valve housing 14.

With reference to FIGS. 2-7, it can be seen that the swivel valve assembly 30 includes a spur gear 44 fixed or coupled to the valve shaft 34 for rotation therewith. The spur gear 44 is formed in metal with a plurality of circumferential teeth 48, an annular recess 52 on a first axial side including threaded bores 54 and an axially-extending protrusion 56, and a central recessed portion 58. The axially extending protrusion 56 is positioned between the threaded bores 54 such that the threaded bores 54 and the axially-extending protrusion 56 are centered on lines that intersect at ninety (90) degrees. A second axial side of the spur gear 44 includes a larger second recessed portion 60. The bearing 36 is nested in this larger second recessed portion 60 of the gear 44 and mounted on the shaft 34. The remainder of the shaft components beyond the bearing 36 are unchanged from the original equipment manufacturer's multi-way control valve.

With reference to FIGS. 2-5 and 7, a magnet 68 in a magnet housing 70 is supported on the metal spur gear 44. In this regard, the magnet housing 70, shown in FIG. 7, has a radial flange 76 that is received in the annular recess 52 of the metal spur gear 44. The radial flange 76 includes a recess 80 in which the axially-extending protrusion 56 is accommodated such that the radial flange 76 of the magnet housing 70 can only be received in the annular recess 52 in a predetermined angular orientation. This ensures proper alignment of the poles of the magnet 68. The magnet housing 70 is secured to the spur gear 44 with screws 84 received in threaded bores 54, see FIG. 5. The magnet and magnet housing may be fixed together by over-molding them together.

Figure 8:
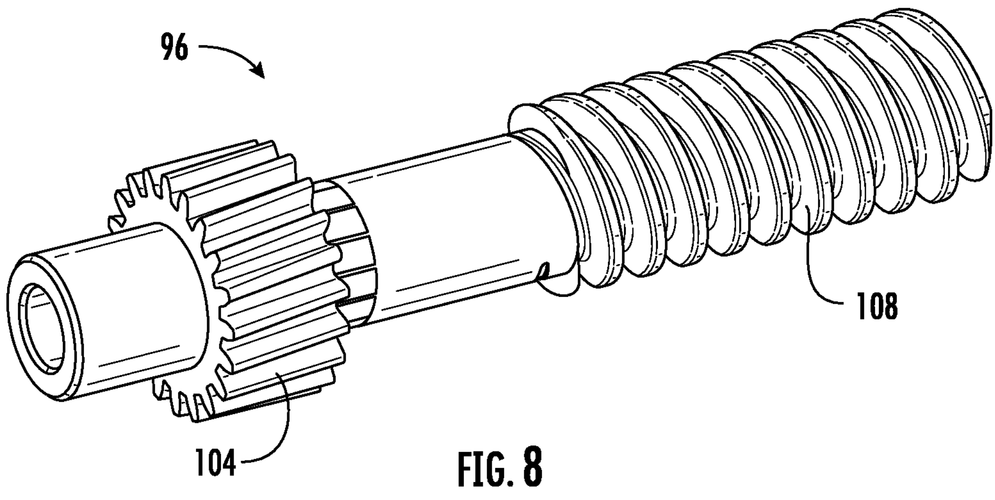

With reference to FIGS. 1 and 8, the multi-way control valve 10 includes an electric motor 88 for driving the swivel valve assembly 30. The electric motor 88 includes an output worm gear 92 coupled to a jackshaft 96, see FIG. 8. The jackshaft 96 is supported at opposite ends by bearing towers 100 in the valve housing 14. A spur gear 104 proximate a first end of the jackshaft 96 is engaged with the output worm gear 92 of the electric motor 88. A second end of the jackshaft 96 is configured as a worm gear 108 that engages with the spur gear 44 of the swivel valve assembly 30. In the preferred embodiment, the jackshaft 96, spur gear 104 and worm gear 108 are a one-piece (monolithic) metallic unitary structure. The jackshaft 96, spur gear 100, and worm gear 104 may be machined from metal.

What is claimed is:

1. A multi-way control valve comprising:

a valve housing;

a swivel valve assembly supported for rotation relative to the valve housing to control a flow of fluid through the valve housing; and an actuator operatively coupled to the swivel valve assembly for rotating the swivel valve assembly, wherein the swivel valve assembly includes:

a gear with at least two threaded apertures, a magnet, and a magnet housing with at least two through holes, wherein:

the magnet is fixed within a central aperture of the magnet housing;

the gear comprises an axial face including an annular recess, and the magnet housing includes an annular flange that is received in the annular recess of the gear; and the annular recess includes an axially extending protrusion that is disposed radially offset from a central axis of the gear, and the annular flange includes a corresponding recess in which the protrusion is received;

wherein the magnet and magnet housing are secured to the gear by fasteners in the at least two through holes that are threaded in the at least two threaded apertures.

2. The multi-way control valve according to claim 1, wherein the gear is a metallic gear press-fitted on a metal shaft.

3. The multi-way control valve according to claim 2, further comprising a valve member on the metal shaft for controlling the flow of fluid through the valve housing.

4. The multi-way control valve according to claim 1, wherein:

the annular flange of the magnet housing can only be received in the annular recess in a single angular orientation.

5. The multi-way control valve according to claim 4, wherein the annular recess includes two diametrically opposed threaded bores, each threaded bore positioned 90 degrees from the protrusion.

6. The multi-way control valve according to claim 1, further comprising a shaft having a spur gear and a worm gear, wherein the spur gear is engaged with an output gear of a motor and the worm gear with the gear of the swivel valve assembly.

7. The multi-way control valve according to claim 6, wherein the shaft, spur gear and worm gear are a monolithic structure.

8. The multi-way control valve according to claim 7, wherein the monolithic structure is metal.

9. A swivel valve assembly for a multi-way control valve comprising:

a metal shaft;

a metal gear that is fixed to the metal shaft for rotation therewith and has at least one threaded aperture;

a magnet; and a magnet housing that is secured to the metal gear with at least one threaded fastener, wherein the metal gear includes an axially extending protrusion disposed radially inwards of an outer diameter of the metal gear, such that a central axis of the protrusion is radially offset from a central axis of the metal gear, and the magnet housing has a recess that mates with the protrusion and positions the magnet housing on the metal gear.

10. The swivel valve assembly according to claim 9, wherein the magnet housing and the magnet are fixed together by over-molding.

11. The swivel valve assembly according to claim 10, wherein the magnet is positioned within a recess in the metal gear.

12. The swivel valve assembly according to claim 11, wherein the metal gear has an axial face including an annular recess, and wherein the magnet housing includes an annular flange received in the annular recess of the metal gear.

13. The swivel valve assembly according to claim 12, wherein the annular recess includes the axially extending protrusion, and the flange includes the recess in which the protrusion is received, whereby the flange of the magnet housing can only be received in the annular recess in a single angular orientation.

14. The swivel valve assembly according to claim 13, wherein the annular recess includes at least two threaded bores, each threaded bore of the at least two threaded bores is positioned 90 degrees from the protrusion.

* * * * *